United States Patent [19]

Tagnon

[11] 3,985,445
[45] Oct. 12, 1976

[54] APPARATUS FOR MEASURING FRONTAL POWER OF CONTACT LENSES

[75] Inventor: Luc André Tagnon, Saint Mande, France

[73] Assignee: Essilor International (Compagnie Generale d'Optique), Joinville Le Pont, France

[22] Filed: June 28, 1974

[21] Appl. No.: 484,347

[30] Foreign Application Priority Data
May 30, 1974 France .............................. 74.18802

[52] U.S. Cl. .............................. 356/125; 350/245; 350/247
[51] Int. Cl.² ......................................... G01B 9/00
[58] Field of Search ............ 206/5.1; 356/124, 125; 350/247, 245

[56] References Cited
UNITED STATES PATENTS

| | | |
|---|---|---|
| 3,779,648 | 12/1973 | Poster .................................. 356/124 |
| 3,820,899 | 6/1974 | McCormack ........................ 356/124 |
| 3,822,096 | 7/1974 | Wilms et al. ......................... 356/124 |
| 3,839,684 | 10/1974 | Matsusha ............................. 350/247 |

Primary Examiner—John K. Corbin
Assistant Examiner—Conrad Clark

[57] ABSTRACT

Apparatus for measuring the frontal power of corneal contact lenses made of a somewhat hydrophilic material and having a predetermined index of refraction in a liquid having itself a predetermined index of refraction. This apparatus comprises a sighting optical system and a measuring optical system spaced from each other and having a common optical axis extending substantially vertically at least in the gap between said two optical systems. It further comprises a small cup disposed in said gap and filled with said liquid, the cup bottom comprising a fluid-tight window centered to said optical axis and means for supporting a contact lens in said liquid in a position centered to said optical axis.

1 Claim, 12 Drawing Figures

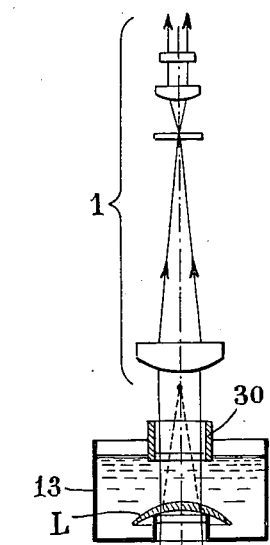
Fig.1.
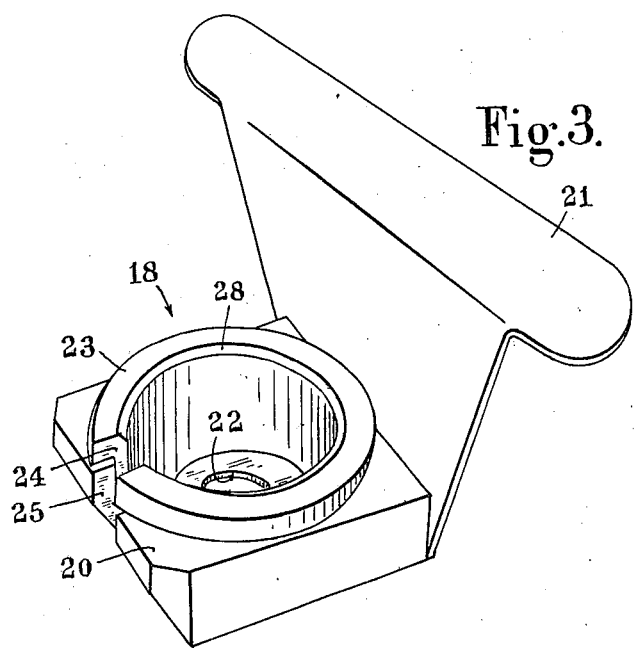
Fig.3.
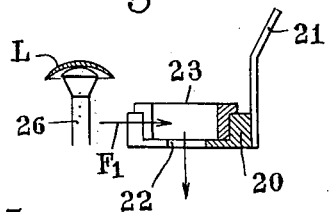
Fig.5.
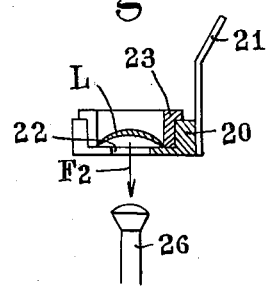
Fig.6.
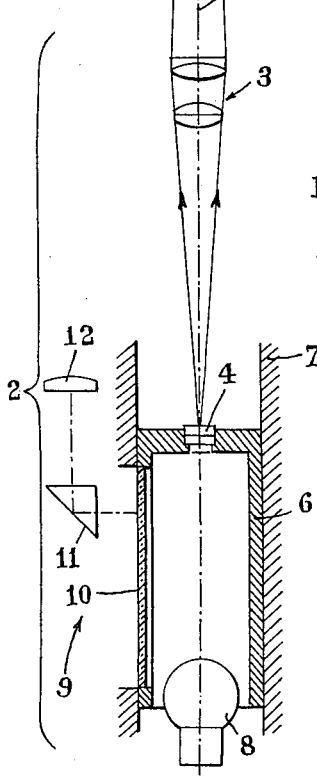
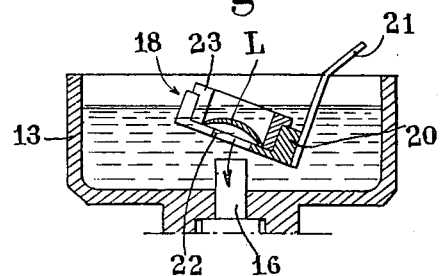
Fig.7.

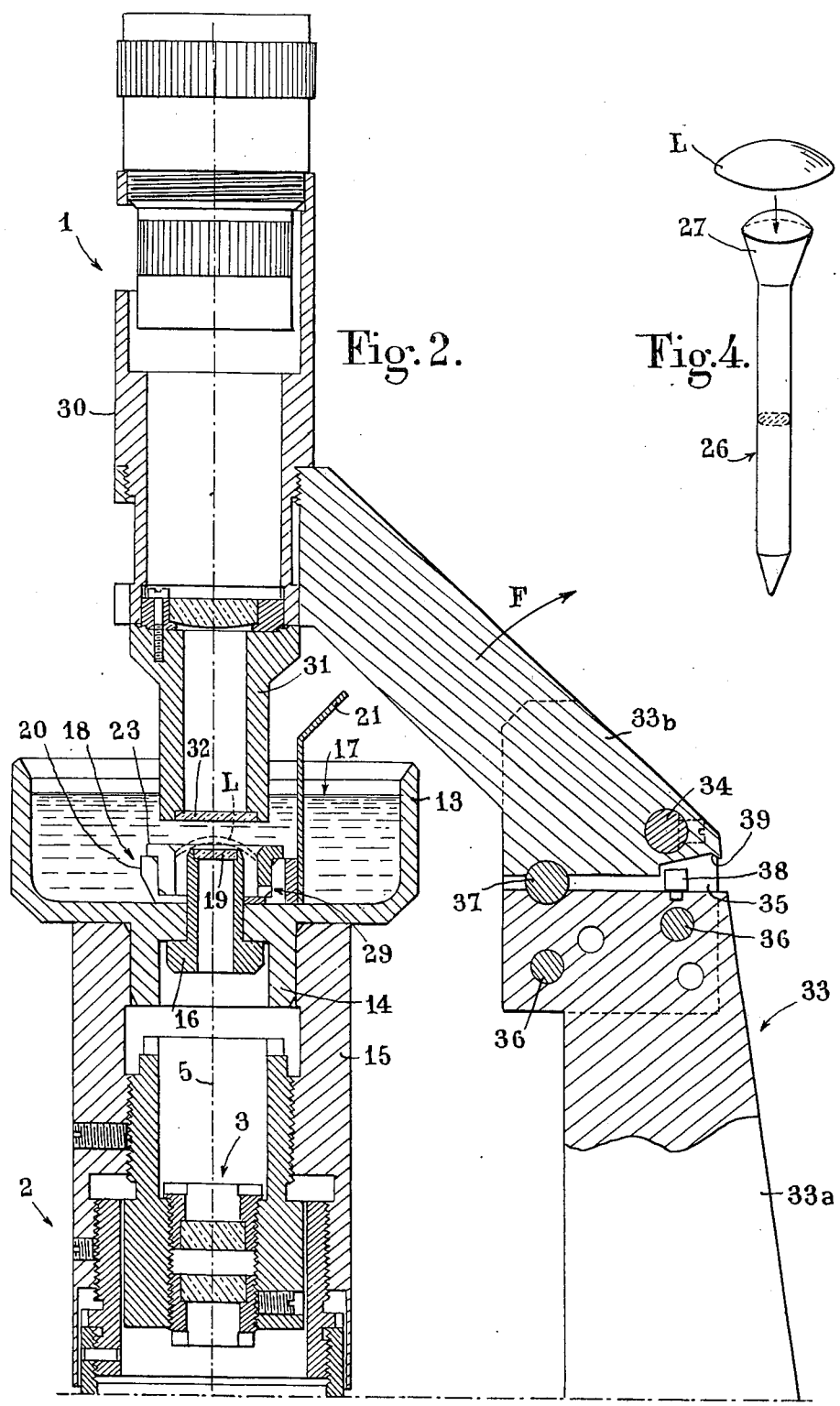

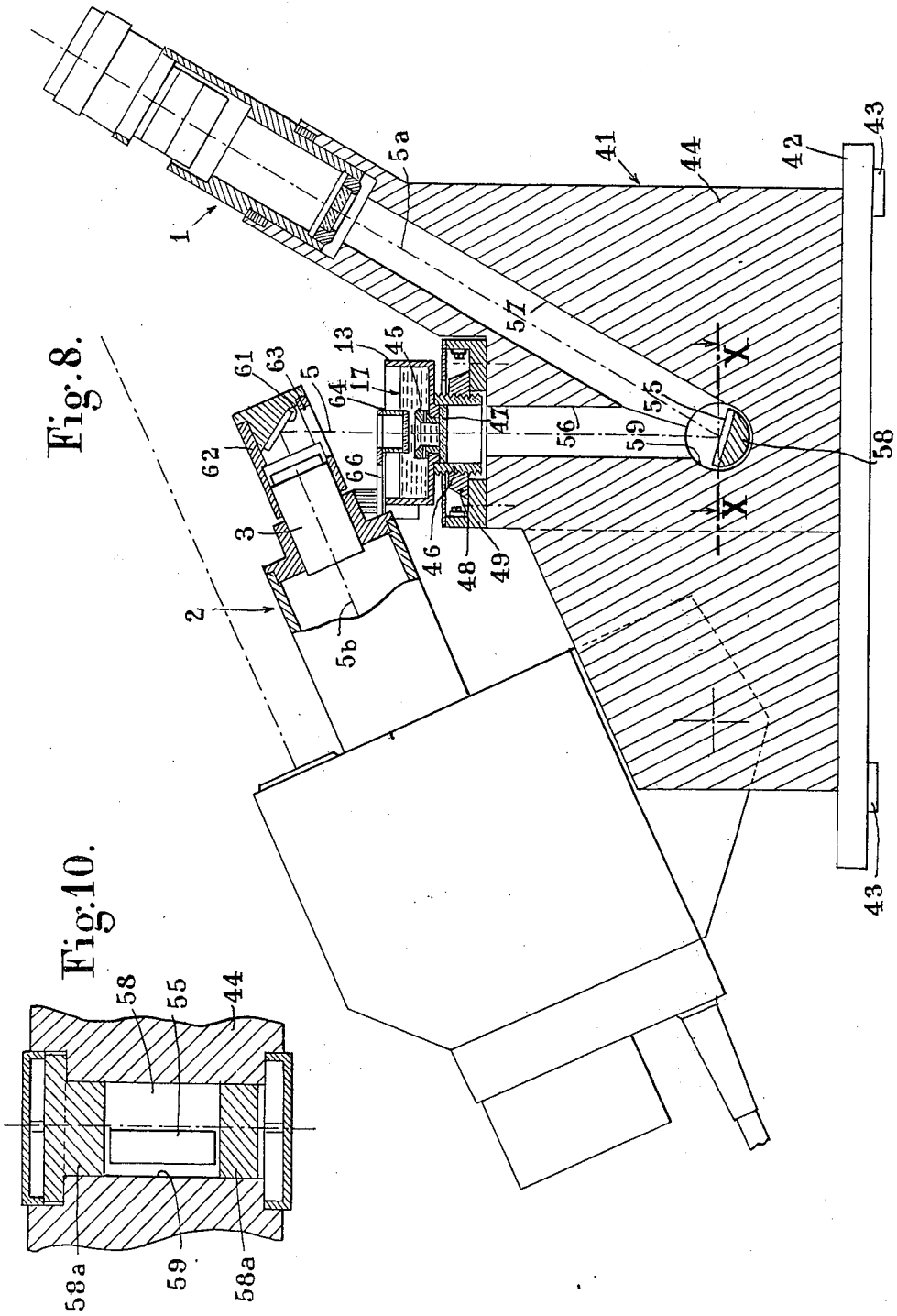

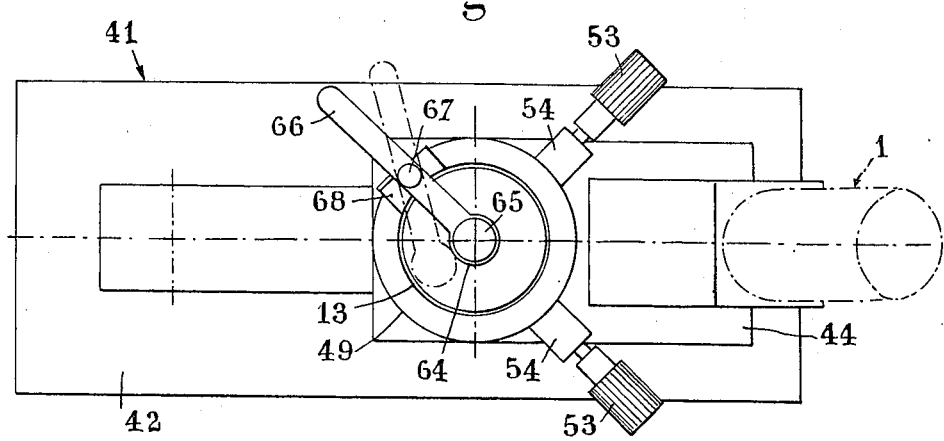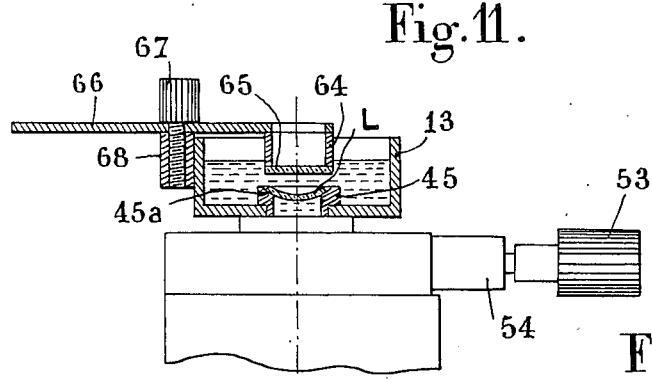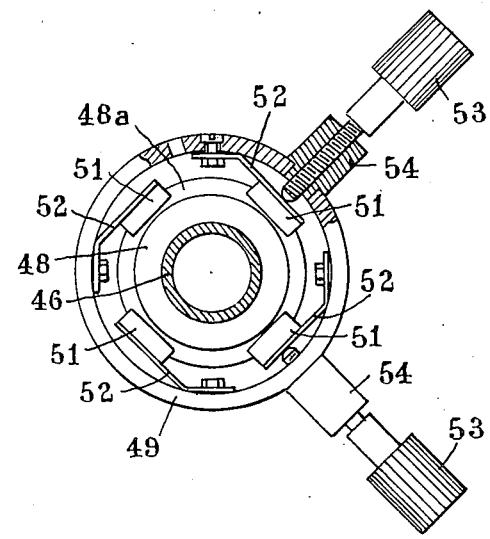

APPARATUS FOR MEASURING FRONTAL POWER OF CONTACT LENSES

BACKGROUND OF THE INVENTION

The present invention relates to an apparatus of the type referred to in the art as a frontofocometer, designed for measuring the frontal power of ophthalmic lenses and more particularly of "soft" corneal contact lenses, i.e. contact lenses made from a somewhat hydrophilic material having a predetermined index of refraction.

In the present specification the term "somewhat hydrophilic material" is used to designate not only hydrophilic materials such as ethylene-glycol monomethacrylate copolymers and ethylene-glycol dimethacrylate copolymers, but also materials which, while not being themselves of a hydrophilic nature, such as silicones, have either undergone a proper treatment for imparting hydrophilic properties thereto, at least to their surfaces, or been coated with a surface layer of hydrophilic material.

It is known that contact lenses of hydrophilic material or of a somewhat hydrophilic nature are preserved, outside the periods in which they are worn by the user, in a special liquid, more particularly a physiological serum or salt solution having properties akeen to those of lachrymal liquor. This physiological salt solution keeps the contact lenses in a "swollen" condition and it is clear that the frontal power of a contact lens made of somewhat hydrophilic material varies according as it is swollen or not with physiological salt solution, or, in actual service, with a mixture of this physiological salt solution with lachrymal liquor. Under these conditions, it is clear that when it is desired to measure the frontal power of a contact lens of this character the measurement should be made when the lens conditions approximate as much as possible those obtaining when the lenses are worn by the user, i.e. in the swollen state, by using a liquid having an index of refraction very close to that of the lachrymal liquor, for example the physiological salt solution in which the lenses are normally stored.

SUMMARY OF THE INVENTION

It is the primary object of the present invention to provide an apparatus of the type set forth hereinabove for measuring the frontal power of corneal contact lenses in a liquid having a predetermined index of refraction.

It is another object of this invention to provide, in an apparatus of the type set forth hereinabove, means for supporting the lens, whereby the contact lens assumes automatically a position in which it is centered to the optical axis of the frontofocometer, without having to provide a special lens holding member for each lens diameter in order properly to centre the lens in the apparatus.

Briefly, the invention provides an apparatus for measuring the frontal power of soft corneal contact lenses made of a somewhat hydrophilic material and having a predetermined index of refraction in a liquid having itself a predetermined index of refraction, said apparatus comprising a frame and, carried by this frame, a measuring optical system and a sighting optical system, said systems being spaced from each other and having a common optical axis, characterized in that said optical axis extends substantially vertically at least in the gap between said two optical systems, and that it further comprises a cup disposed in said gap and filled with said liquid, the bottom of said cup comprising a fluid-tight window permitting the passage of light beams through the cup bottom, and means for supporting the contact lens of which it is desired to measure the frontal power in said liquid in a position centered to said optical axis.

With this arrangement, the frontal power of a contact lens made from a somewhat hydrophilic material can be measured under conditions very close to those prevailing in normal use.

According to an advantageous embodiment of the present invention the contact lens support means comprise an annular seat having a tapered bearing surface disposed coaxially to the vertical optical axis of the apparatus, said tapered surface tapering downwards and being adapted to receive the convex face of said contact lens.

Due to the provision of said seat-forming tapered surface of the lens support, when the contact lens is immersed into the liquid filling the small cup and allowed to fall upon said seat, it is centered automatically in relation to the axis of the tapered surface and therefore to the vertical optical axis of the apparatus, irrespective of the contact lens diameter and without having to provide different centering means for each lens diameter.

A detailed description of the present invention will now be given by way of illustration with reference to the attached drawings, in which:

BRIEF DESCRIPTION OF THE DRAWINGS

FIG. 1 is a diagram illustrating the basic principle of a frontofocometer in which the present invention is incorporated;

FIG. 2 is a fragmentary sectional view showing more particularly the frontofocometer section constructed according to a first embodiment of the present invention;

FIG. 3 is a perspective view showing on a larger scale a centering device adapted to hold the contact lens in proper centered relationship to the optical axis of the frontofocometer during the measuring operation, and also adapted to be used for inserting the contact lens and removing same into and from the frontofocometer;

FIG. 4 is a perspective view showing a member for positioning a contact lens in the device illustrated in FIG. 3;

FIG. 5, 6 and 7 are part-sectional detail views showing the positioning of a contact lens in the device shown in FIG. 3 and the positioning of the device itself in a frontofocometer;

FIG. 8 is a part-elevational, part-sectional view of a frontofocometer according to a modified embodiment of this invention;

FIG. 9 is a plan view from above of the frontofocometer illustrated in FIG. 8, but with parts removed therefrom to show more clearly other elements of the apparatus;

FIG. 10 is a fragmentary view showing on a larger scale a section taken along the line X—X of FIG. 8;

FIG. 11 is a fragmentary part-sectional, part-elevational view showing on a larger scale a detail of the apparatus; and FIG. 12 is a fragmentary view showing on a larger scale, with parts broken away, another detail of the apparatus.

DESCRIPTION OF THE PREFERRED EMBODIMENTS

Referring firstly to FIG. 1 of the drawings, it will be seen that the frontofocometer according to this invention comprises in a manner already known per se an optical observation or sighting system 1, and an optical measuring system 2, these systems 1 and 2 being mounted at an axial distance from each other in a common frame (not shown in FIG. 1) so that their optical axes merge into each other. The sighting system 1 may consist for example of a sighting telescope set to infinity. Likewise, the measuring optical system 2 may comprise, in a manner known per se, a measuring lens system or objective 3, a "test" or object 4 centered to the optical axis 5 common to both optical systems 1 and 2, and adapted to be moved along said optical axis 5 by means of a barrel 6 slidably mounted in a guide member 7 rigid with the frame of the apparatus, a bulb 8 for illuminating the test or object 4, and a reading device 9 for reading the measured frontal power. This device 9 may comprise in a manner known per se a scale 10 divided into diopters and dioptric fractions and secured to the barrel 6 so as to be movable bodily therewith in front of a fixed reference mark (not shown), and also a mirror 11 associated with an observation window 12 advantageously consisting of a magnifying lens. Of course, instead of providing a graduated scale movable bodily with the barrel 6, associated with a fixed reference mark or line, the reverse arrangement may be contemplated, i.e. a movable reference mark or line and a fixed or stationary barrel 6 with its graduated scale.

According to a specific feature characterizing the present invention, the optical axis 5 extends substantially vertically at least in the axial space provided between the two optical systems 1 and 2. Moreover in this space, a small cup 13 filled with a liquid having a predetermined index of refraction, for instance a physiological salt solution such as currently used for storing and preserving corneal contact lenses made of hydrophilic material.

Reference will now be made to FIG. 2 illustrating a typical embodiment of the present invention. The frontofocometer partially illustrated in this Figure is very much similar to the two frontofocometers of the type X-45 and X-46 marketed by ESSILOR INTERNATIONAL (Cie Generale d'Optique), JOINVILLE-le-PONT, France, a French Society to which the present application has been assigned; therefore, only the elements of this frontofocometer having a direct bearing with the present invention will be described in detail hereinafter.

As clearly illustrated in FIG. 2, the cup 13 has at its bottom a depending hollow cylindrical extension 14 fitting without play in the open top portion of a socket 15 connected to the frontofocometer frame and adapted normally to receive the measuring objective 3 of the measuring optical system 2. This socket 15 is coaxial with the common optical axis 5 of the measuring optical system 2 and sighting optical system 1. Means are provided in the bottom of cup 13 for supporting the contact lens L in the liquid and holding same in a centered position in relation to said common optical axis. These supporting and centering means consist on the one hand of a hollow cylindrical member 16 coaxial to the optical axis 5 and extending upwards from the bottom of said cup 13 to which it is secured, up to a level beneath the level 17 attained by the liquid in said cup, and on the other hand of a centering device 18 to be described presently in detail. The hollow cylindrical member 16 extends in a fluid-tight manner through a hole formed coaxially to the optical axis 5 in the bottom of said cup 13, and a window 19 consisting for example of a parallel-faced transparent blade is provided for sealing the central hole of said hollow cylindrical member, at the top end thereof, just beneath the contact lens L supported by said top end.

The centering device 18 is fitted coaxially on the hollow cylindrical member 16 but is easily detachable therefrom so that it can be used for positioning the contact lens L on the upper end of said hollow cylindrical member 16 and properly centering said lens L in relation to the optical axis 5.

As illustrated in FIGS. 2 and 3 of the drawings the centering device 18 comprises essentially two sections. More particularly, it comprises a basket-like holder 20 provided with a handle 21 and having a central hole 22 in its bottom, the diameter of this hole 22 being equal to or slightly greater than the outer diameter of said cylindrical member 16, and a centering ring 23 coaxially and detachably fitted in said holder 20. The inner diameter of ring 23 is equal to, or very slightly greater than, the outer diameter of the contact lens L. Therefore, in actual service, a range of centering rings 23, all adapted to be fitted separately in said holder 20 but having different inner diameters corresponding to the outer diameters of commercially available contact lenses, may be contemplated. Both holder 20 and centering ring 23 are provided with a radial slot 24, 25 of a width somewhat smaller than the diameter of the central hole 22 of said holder 20. The pair of slots 24 and 25 are brought in mutual alignment to permit the insertion of a contact lens into the hole of centering ring 23, in the bottom of holder 20, with the assistance of a rod 26 (see FIG. 4). This rod 26 has a substantially flattened cross-sectional contour so that at least one dimension of this cross-section be smaller than the width of said slots 24 and 25. Moreover, as shown in FIG. 3, the rod 26 comprises at its upper end a head 27 adapted to receive a contact lens L and having a diameter somewhat greater than the width of said slots 24 and 25, but smaller than the diameter of said central bottom hole 22 of said holder 20.

FIGS. 5 and 6 illustrate diagrammatically the manner in which a contact lens L is positioned in the central hole of ring 23 and upon the bottom of holder 20. As shown in these Figures, the rod 26 on top of which the contact lens L was placed is firstly introduced radially through the slots 24, 25 of centering ring 23 and holder 20 into the hole 22, as shown by the arrow $F_1$. Then, the rod 26 is moved vertically downwards in the hole 22 as shown by the arrow $F_2$ until the contact lens L is lowered into the central hole of centering ring 23, i.e. to the bottom of holder 20. A bevel 28 (FIG. 3) is formed on the inner upper edge of centering ring 23 to facilitate the centering of lens L as it engages the central hole of this ring 23.

In order to be sure that the slots 24 and 25 are exactly coincident when the centering ring 23 is fitted into the holder 20, complementary indexing means 29, such as a tenon and a matching notch, may advantageously be provided in the holder 20 and in the centering ring 23 to facilitate the mutual positioning of these two members.

Referring again to FIG. 2, it will be seen that the mount 30 of the optical sighting system 1 comprises a downward extension in the form of a hollow cylindrical member 31 coaxial to the optical axis 5 and partially immersed into the liquid contained in said cup 13. At its lower end the hollow cylindrical member 31 is sealed in a fluid-tight manner by a parallel-faced transparent blade 32. The purpose of the arrangement is to prevent wrinkles likely to develop on the surface of the liquid contained in cup 13 from interfering with the observation during the measurement operation.

On the other hand, as already known per se, the mount 30 of said sighting system 1 is secured to one end of an arm 33 having its other end connected to the frame of the apparatus. However, according to this invention, the aforesaid arm 33 comprises two sections 33a and 33b pivoted to each other by means of a pivot pin 34 having its ends trunnioned in a pair of lateral wings 35 (of which one only is visible in FIG. 2) secured by means of screws 36 to the section 33a of arm 33. With this arrangement, the optical sighting system 1 can be brought selectively either to an operative position as shown in FIG. 2, or to a release or clear position, i.e. away from the cup 13, to permit the insertion of the centering device 18 carrying the contact lens L on the support member 16, as illustrated in FIG. 7, and also the removal of this centering device 18 with its lens L from the cup 13. The aforesaid operative position is determined by the presence of an abutment member 37, consisting for instance of a cylindrical member having its ends fitted in said lateral wings 35, and the aforesaid release or clear position is determined by another abutment member 38 rigid with the section 33a of arm 33 and adapted to engage a registering face 39 of section 33b when this section 33b is pivoted in the direction of the arrow F (FIG. 2).

Now the operation of the apparatus of this invention will be described in detail. The optical sighting system 1 is firstly moved to its release or clear position and the contact lens L to be measured, which consists of a somewhat hydrophilic material as defined hereinabove, is disposed in the centering device 18 in the manner described and illustrated in FIGS. 5 and 6. This centering device 18 supporting the contact lens L is then disposed on the cyclindrical member 16 as shown in FIG. 7, whereafter the optical sighting system 1 is restored to its operative position as shown in FIG. 2. Thus, the frontal power of the corneal contact lens L can be measured. Since soft contact lenses are particularly thin, the frontal power and focal power will be assimilated with each other for the calculation purposes. As in known frontofocometers, this measurement is based on the well-known compensation principle. The assembly comprising the test or object 4, the measuring objective 3 and the contact lens L to be measured are to be used and to behave like a collimating lens system. The power of the soft contact lens L introduced into the system is compensated by moving the test 4.

After the contact lens L has been immersed into the liquid contained in said cup 13 as explained hereinabove, the sliding barrel 6 supporting the test 4 is moved until a clear image og said test 4, as seen through the system assembly, is obtained.

Since the movement performed by said test 4 is proportional to the frontal power of the lens to be measured, during the movement of the sliding barrel 6 the graduated scale 10 moves past the fixed reference mark or line and one scale line will register with said fixed reference mark. Thus, it is only necessary to read the value shown by the graduated scale. However, this implies that the apparatus has been properly gaged, or, in other words, that:

A. when no soft contact lens is present in the device, the clear image of the test is obtained when the "O" line of the graduated scale registers with the fixed reference mark, B. the graduation lines of said scale correspond to the measured values in diopters.

Now this measuring principle is well known in the art. However, the following remarks should be made. The focal power of a contact lens in air is given by the following formula:

$$P = (n_l - 1)\left(\frac{1}{R_1} - \frac{1}{R_2}\right) \qquad (1)$$

wherein $n_l$ is the index of refraction of the lens, and $R_1$ and $R_2$ = radii of curvature of the lens.

Thus, if the lens L is immersed, the focal power $P_i$ thereof in the liquid is measured, and this focal power $P_i$ is given by the formula:

$$P_i = (n_l - n_i)\left(\frac{1}{R_1} - \frac{1}{R_2}\right) \qquad (2)$$

wherein $n_i$ is the index of refraction of the immersion liquid.

The characteristics of the material constituting the contact lens do not permit a direct measurement of P under conditions approximating those in which the lens is used, that is, with the lens in an air medium but swollen with liquid; therefore, $P_i$ is measured by means of the above-described apparatus. Now, from the above formulae (1) and (2) the following relationship between powers P and $P_i$ can be calculated:

$$P = P_i \frac{(n_l - 1)}{(n_l - n_i)} \qquad (3)$$

and one can set:

$$K = \frac{n_l - 1}{n_l - n_i},$$

which is a constant factor.

Thus, for instance, assuming that $n_l = 1.435$ and $n_i = 1.335$, the result will be $K = 4.35$. With respect to a conventional frontofocometer, the reading scale is thus compressed and, to preserve the same reading scale as in conventional frontofocometers the focal distance $f$ (in mm) of the measuring objective 3 must be changed, so that:

$$f = \sqrt{K \cdot d \cdot 1000} \qquad (4)$$

wherein

K is the above-defined constant and d is the distance in mm between two graduation lines corresponding to one diopter on the reading scale, and 1000 is the distance in mm of an object spaced 1 from the objective lens 3.

Moreover, it will be seen from the foregoing that the frontofocometer is gaged for measuring the frontal power of contact lenses having a given frontal power $n_l$. However, it is easy for one ordinary skilled in the art to design a frontofocometer capable of measuring by immersion the frontal power of contact lenses of which the indices of refraction vary through a certain range. In fact, it is only necessary to contemplate for the measuring objective 3 a variable-focus lens system of the "zoom" type with a focus adjusting ring bearing indices of refraction marks. Thus, by setting each time the focus as a function of the index of refraction of the contact lens of which it is desired to measure the frontal power, it is possible to measure the frontal powers of lenses having different indices of refraction.

On the other hand, in a modified arrangement of the above-described embodiment of the invention the movement of the sighting optical system 1 from an operative position to a release or clear position may be obtained not by tilting this system about the pivot pin 34 as described hereinabove but by sliding same in the direction of the optical axis 5. Moreover, although in the embodiment illustrated in the drawings the optical axis 5 extends vertically throughout the path of the light beam issuing from the light source 8, another arrangement may be contemplated without departing from the basic principle of the invention. In fact, if for obvious reasons the optical axis must compulsorily extend vertically or substantially vertically in the gap between the optical sighting system 1 and the optical measuring system 2, in which gap the cup 13 is located, it is not absolutely necessary that the optical axis extends vertically through the other parts of the apparatus. Thus, the path followed by the light beam may be bent obliquely or at right angles in relation to the vertical by using one or several mirrors both in the sighting optical system and in the measuring optical system, thus affording a substantial reduction in the vertical dimension of the apparatus, or improving appreciably the compactness of the apparatus.

Now reference will be made to FIGS. 8 to 12 inclusive to describe another typical embodiment of the apparatus of this invention.

In these FIGS. 8-12, the reference numerals also found in FIGS. 1-7, designate the same component elements or elements performing the same function; consequently, it is not deemed necessary to describe them again in detail.

The frontofocometer illustrated in FIGS. 8 and 9 comprises a rigid frame 41 carried by a base plate 42 having feet 43 and a solid body 44 supporting the sighting optical system 1 and the measuring optical system 2. Furthermore, the body 44 carries a cup 13 filled with a liquid having a predetermined index of refraction.

As shown more particularly in FIG. 11, the contact lens L of which it is desired to measure the frontal power is supported in the liquid contained in said cup 13 by means of an annular seat 45. This annular seat 45 is secured in a central bore formed in the bottom of cup 13 and has formed at its upper edge a tapered bearing surface 45a having its axis coincident with that of said annular seat 45, the taper being directed inwards and downwards. The diameters of the circular sections of major diameter and minor diameter of said tapered surface 45a are selected with a view to enable this tapered surface to receive the convex face of contact lenses having their diameters included in a relatively wide range.

Referring again to FIG. 8, it will be seen that a socket 46 formed with external screw-threads is secured at its upper end to the bottom of cup 13 so as to depend therefrom coaxially to said seat 45. Likewise, secured to the bottom of said cup 13 is a transparent glass window having parallel major faces for closing in a fluid-tight manner the central bore formed in the bottom of said cup 3 in order to prevent any leakage of the fluid contained in cup 13 while permitting the passage of light beams vertically and successively through the liquid, the contact lens L of which the frontal power is to be measured, again the liquid and finally the window 47. The socket 46 is screwed coaxially in the tapped hole of a ring 48 having a flat horizontal lower face whereby it bears upon a flat horizontal surface on which it can slide. This flat horizontal surface is the inner bottom face of a cylindrical cup-shaped member 49 secured to the body 44 of the frame. Means are provided to permit a movement of the liquid-filled cup 13 in at least two directions at right angles to each other and to the vertical optical axis 5 of the frontofocometer, for bringing the axis of said tapered surface 45a of the seat, and therefore also the optical axis of the corneal contact lens L supported by said seat, in alignment with the aforesaid optical axis 5 of the frontofocometer. To this end, as shown in FIG. 12, the ring 48 is retained between four shoes or pads 51 secured to the free ends of four springsteel resilient arms 52 having their other ends secured to the inner cylindrical wall of said cup-shaped member 49. Due to the resilient action of said arms 52, the shoes 51 set at 90-degree intervals from each other exert a radial inward pressure on the outer peripheral surface of ring 48. Preferably, the outer peripheral surface of this ring 48 is tapered, as shown in FIG. 8, with the minor diameter on the top of the ring so that when urged by said shoes 51 the ring 48 will be pressed against the bottom of cup-shaped member 49. A pair of screws 53 having knurled enlarged external heads engage nuts 54 set radially through the cylindrical wall of cup-shaped member 49. These screws 53 engage with their inner ends a pair of shoes 51 spaced 90° apart (i.e. not diametrally opposed) to permit the adjustment of the horizontal position of cup 13.

Since in the present embodiment of the invention, the convex face of contact lens L is facing downwards, and since the measurement of the frontal power of a lens is accomplished as a rule by so placing the lens that its convex face is directed towards the sighting optical system 1 and its concave face towards the measuring optical system 2, in this embodiment it is not possible to dispose the sighting optical system 1 above the cup 13 and the measuring optical system 2 beneath this cup 13 as in the preceding embodiment shown in FIGS. 1 and 2. Therefore, as shown in FIG. 8, the optical axis 5a of the sighting optical system is set at an angle to the vertical and a first mirror 55 is inserted in the path of the light beam beneath the cup 13 and so arranged or set as to reflect upwards along the optical axis 5a of the sighting optical system the light beams passing vertically downwards through the cup 13 and contact and contact lens L contained therein. Moreover, to permit the passage of this light beam from cup 13 to mirror 55 and from this mirror 55 to the sighting optical system 1, the bottom of said cup-shaped member 49 has an aperture formed therethrough and holes 56, 57 are formed in the body 44 coaxially to the cylindrical cup-shaped member 49 and to the sighting optical system 1. As illustrated in FIG. 8, the optical axes 5 and 5a intersect each other at a point located on the reflecting surface of said mirror 55. This mirror 55 is carried by a semi-cylindrical support 58 comprising at its ends cylindrical portions 58a (FIG. 10) trunnioned in a cylindrical hole 59 formed in said body 44 and having its axis perpendicular to the axes 5 and 5a, at their point of intersection. With this mounting of mirror 55 it is possible to adjust the mirror setting in such a manner that the normal to its reflecting surface merges into the bissectrix of the angle formed between said axes 5 and 5a.

Moreover, in order to reduce the vertical dimension of the frontofocometer, the optical axis 5b of the measuring optical system 2 is also set at an angle to the vertical, as shown in FIG. 8, and another mirror 61 is provided above the cup 13 and set for reflecting vertically downwards the light beam from the measuring optical system 2. This mirror 61 is carried by a mount 62 secured to the upper end of the optical measuring system 2. An opening 63 is formed laterally in the mount 62 to permit the passage of said light beam.

On the other hand, to avoid any interference in the observation and measurements as a consequence of wrinkles possibly developing on the surface 17 of the liquid contained in said cup 13, a cylindrical socket 64 having a vertical axis and closed at its lower portion by a fluid-tight window 65 consisting of a parallel-faced glass plate is provided. This socket 64 is partially immersed in the liquid contained in the cup 13, just above the lens L carried by the seat 45, in a position coaxial to the optical axis 5 of the apparatus. To place the contact lens L in its measuring position and to remove same therefrom, the socket 64 is movable away and towards the aforesaid position. To this end, it is mounted to one end of a control lever 66 pivoted to the edge of said cup 13 by means of a screw acting as a pivot pin and engaging a tapped hole formed in a small block 68 secured to the cylindrical wall of said cup 13.

Of course, the various embodiments illustrated and described herein should not be construed as limiting the present invention since they are given by way of illustration only, not of limitation. Thus, many modifications and changes may be brought thereto without departing from the basic principle of the invention as set forth in the appended claims.

What I claim is:

1. Apparatus for measuring the frontal power of soft corneal contact lenses made of a somewhat hydrophilic material having a predetermined index of refraction, in a liquid having itself a predetermined index of refraction, which comprises a frame and, mounted on this frame, a measuring optical system and a sighting optical system spaced from each other and having a common optical axis extending substantially vertically at least in the gap between said two optical systems, a cup disposed in said gap and filled with said liquid, the cup bottom comprising a fluid-tight window permitting the passage of light beams from said measuring optical system to said sighting optical system, and means for supporting and centering a contact lens of which it is desired to measure the frontal power in said liquid in a substantially horizontal position with the optical axis of the contact lens merging into the vertical optical axis of the apparatus, said sighting optical system extending vertically, and being movably mounted on said frame so that it can selectively be brought to an operative position with its lower end immersed into the liquid contained in said cup and to a clear position away from said cup, to permit the positioning and removal, respectively, of the supporting and centering means with the contact lens to be measured.

* * * * *